United States Patent Office.

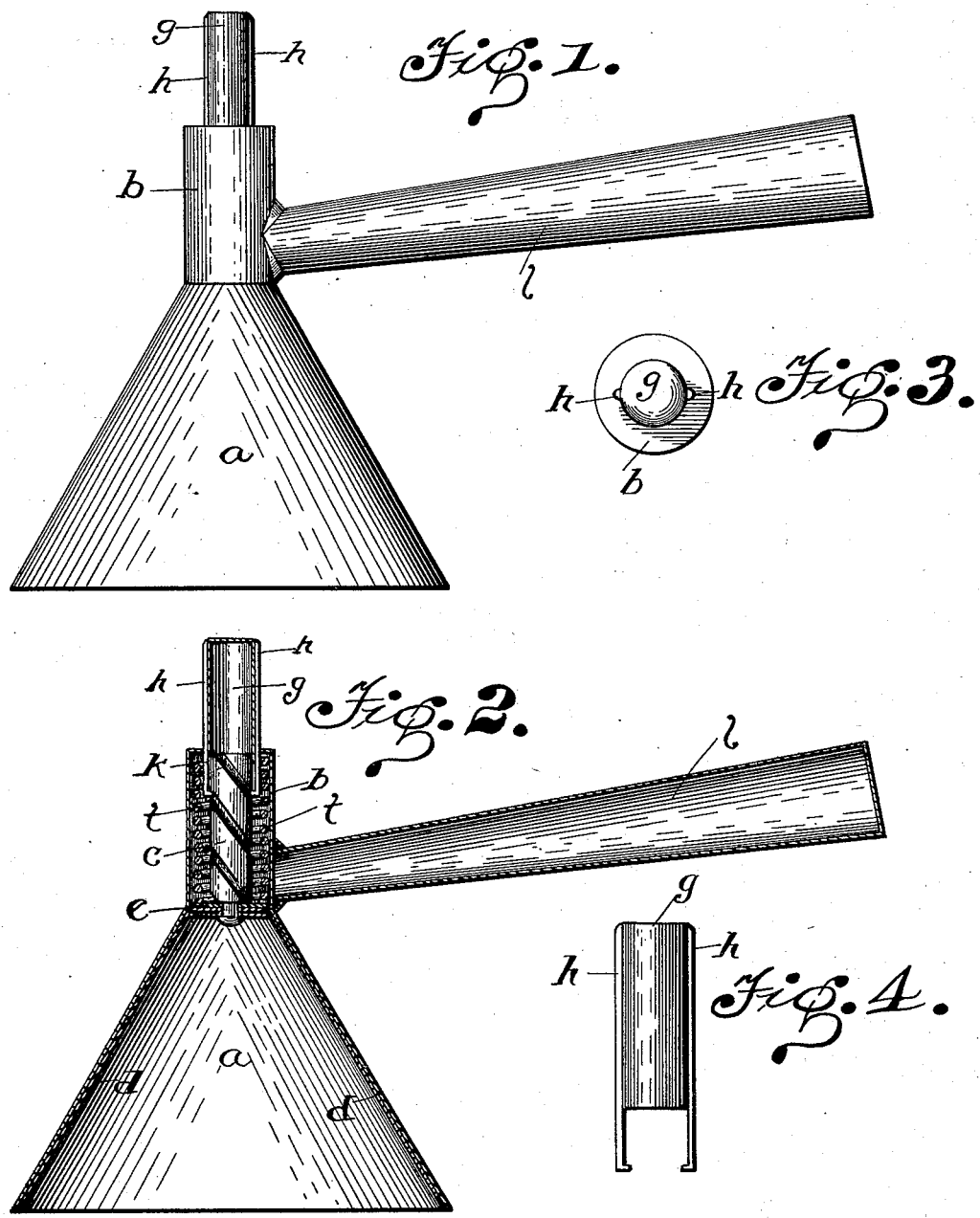

HENRY J. PFEIFFER, OF PITTSBURG, PENNSYLVANIA.

ICE-CREAM MOLD AND DISHER.

SPECIFICATION forming part of Letters Patent No. 571,170, dated November 10, 1896.

Application filed September 1, 1896. Serial No. 604,569. (No model.)

*To all whom it may concern:*

Be it known that I, HENRY J. PFEIFFER, a citizen of the United States of America, residing at Pittsburg, in the county of Allegheny and State of Pennsylvania, have invented certain new and useful Improvements in Ice-Cream Molds and Dishers, of which the following is a specification, reference being had therein to the accompanying drawings.

This invention relates to certain new and useful improvements in ice-cream molds and dishers, and has for its object to construct a mold and disher that can be conveniently and easily operated with one hand.

The invention has for its further object to construct a disher and mold of the above-referred-to class that will be extremely simple in its construction, strong, durable, effectual in its operation, and comparatively inexpensive to manufacture; furthermore, that by requiring only the one hand to operate will leave the other hand of the operator free to manipulate the saucers or plates, and thus expediting the work to a considerable degree.

With the above and other objects in view the invention finally consists in the novel construction, combination, and arrangement of parts, to be hereinafter more specifically described, and specifically pointed out in the claim.

In describing the invention in detail reference is had to the accompanying drawings, forming a part of this specification, and wherein like letters of reference indicate similar parts throughout the several views, in which—

Figure 1 is a side elevation of my improved mold and disher. Fig. 2 is a vertical sectional view of the same. Fig. 3 is a side view of the operating-plunger, and Fig. 4 is a top plan view of the plunger and casing around the screw.

In the drawings, *a* represents the mold, which is shown cone shape in form, and has secured on the apex thereof a casing *b*. A worm-screw *c* is journaled in the apex of the said mold and carries on its lower end the cutters *d d*, said worm-screw having secured thereto between the shoulder on same and the top of the mold a washer *e*, to which is secured a coil-spring *f*, the upper end of said spring being attached to the top of the casing *b*. A plunger *g* on the top of the worm-screw is provided with flanges *h h*, directly opposite each other, which operate through grooves in the top of the casing, and are bent inwardly below the base of the plunger, and engage in the threads *k k* of the worm-screw. To the casing is secured a suitable handle *l*, which may be of any desired construction, but preferably inclined slightly, as I have shown in the drawings, as it makes a more perfect dipper.

The operation of my improved mold and disher will be readily apparent from the views of the same that I have shown in the drawings; but for the purpose of illustrating the same more clearly I will describe it further, and assume for the purpose of this illustration that the parts have all been secured in their respective positions.

When the mold has been filled with the cream, the operator places the thumb on the top of the plunger, and by pressing downward on the same causes the ends of the side flanges to travel in the threads of the worm-screw, operating the same and revolving the cutters through this medium. When the pressure on the plunger is relieved, the coil-spring, which would by the previous operation be wound more tightly around the worm-screw, will return to its normal position, reversing the movement of the screw and again forcing the plunger to its normal position at the top of the cylinder, and the disher is again ready for use.

It will be noted that various changes may be made in the details of construction without departing from the general spirit of my invention.

Having fully described my invention, what I claim as new, and desire to secure by Letters Patent, is—

In an ice-cream mold and disher, the mold, a worm-screw journaled in the apex of said mold, cutters secured on said screw, a casing around the screw, a coil-spring around the screw, said spring secured at the upper end to the casing and at the base to a washer on the screw, a plunger carrying flanges projecting inwardly at the base to engage in the threads of the screw and operate the same, and a suitable handle secured to the casing, substantially as shown and described.

In testimony whereof I affix my signature in presence of two witnesses.

HENRY J. PFEIFFER.

Witnesses:
 A. M. WILSON,
 H. E. SEIBERT.